United States Patent
Rifkin et al.

(10) Patent No.: US 10,360,614 B1
(45) Date of Patent: Jul. 23, 2019

(54) ASSESSING AND RATING DEPLOYMENTS OF RESOURCES

(71) Applicant: Amazon Technologies, Inc., Seattle, WA (US)

(72) Inventors: Erin Nicole Rifkin, Seattle, WA (US); Philip Fitzsimons, New Malden (GB); Michael Lee Garza, Seattle, WA (US); Paul Horvath, San Juan Capistrano, CA (US); Thomas Boyd Johnston, Seattle, WA (US); Johnathon Paul Anthony Meichtry, Singapore (SG); Attila Narin, Capellen (LU); Paul Nau, Black Diamond, WA (US); Lawrence Mark Pizette, Westford, MA (US); Max Moon Ramsay, Shoreline, WA (US); David Arthur Stanford, Jr., Snoqualmie, WA (US); Saurabh Dwivedi, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1028 days.

(21) Appl. No.: 14/812,943

(22) Filed: Jul. 29, 2015

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0631* (2013.01); *G06Q 30/0282* (2013.01)

(58) Field of Classification Search
None
See application file for complete search history.

(56) References Cited

U.S. PATENT DOCUMENTS

2015/0294377 A1* 10/2015 Chow ............... G06Q 30/0263 705/347

* cited by examiner

*Primary Examiner* — Mila Airapetian
(74) *Attorney, Agent, or Firm* — Thorpe North & Western, LLP.

(57) ABSTRACT

Technology is described for providing assessments of resource deployments in a computing service environment. A group of related resources may be identified in a computing service environment. The group of related resources may be associated with a single customer. A rating for the group of related resources may be determined based in part on design characteristics of the group of related resources and runtime behavior of the group of related resources. A resource configuration recommendation may be provided based on the rating. The resource configuration recommendation may include alternative resource configurations to improve the rating for the group of related resources.

20 Claims, 9 Drawing Sheets

ASSESSING AND RATING DEPLOYMENTS OF RESOURCES

BACKGROUND

The advent of virtualization technologies for computing resources has provided benefits with respect to managing large-scale computing resources for many customers with diverse needs. In addition, virtualization technologies have allowed various computing resources or computing services to be efficiently and securely shared by multiple customers. For example, virtualization technologies may allow a single physical host (e.g., a single physical computing machine) to be shared among multiple customers by providing each customer with one or more computing instances hosted by the single physical host using a hypervisor. A computing instance may be a guest machine acting as a distinct logical computing system that provides a customer with the perception that the customer is the sole operator and administrator of a given virtualized hardware computing resource.

The customer may be provided with a wide range of choices regarding the configuration of the virtualized hardware computing resource. Some configurations of virtualized hardware and software may be more effective than other configurations. Specifically, the customer may experience various levels of performance based on the configuration of the virtualized hardware computing resource. Due to the large number of possible configurations of virtualized hardware and related software, customers may find that selecting effective configurations is challenging.

DETAILED DESCRIPTION

Figure 1:
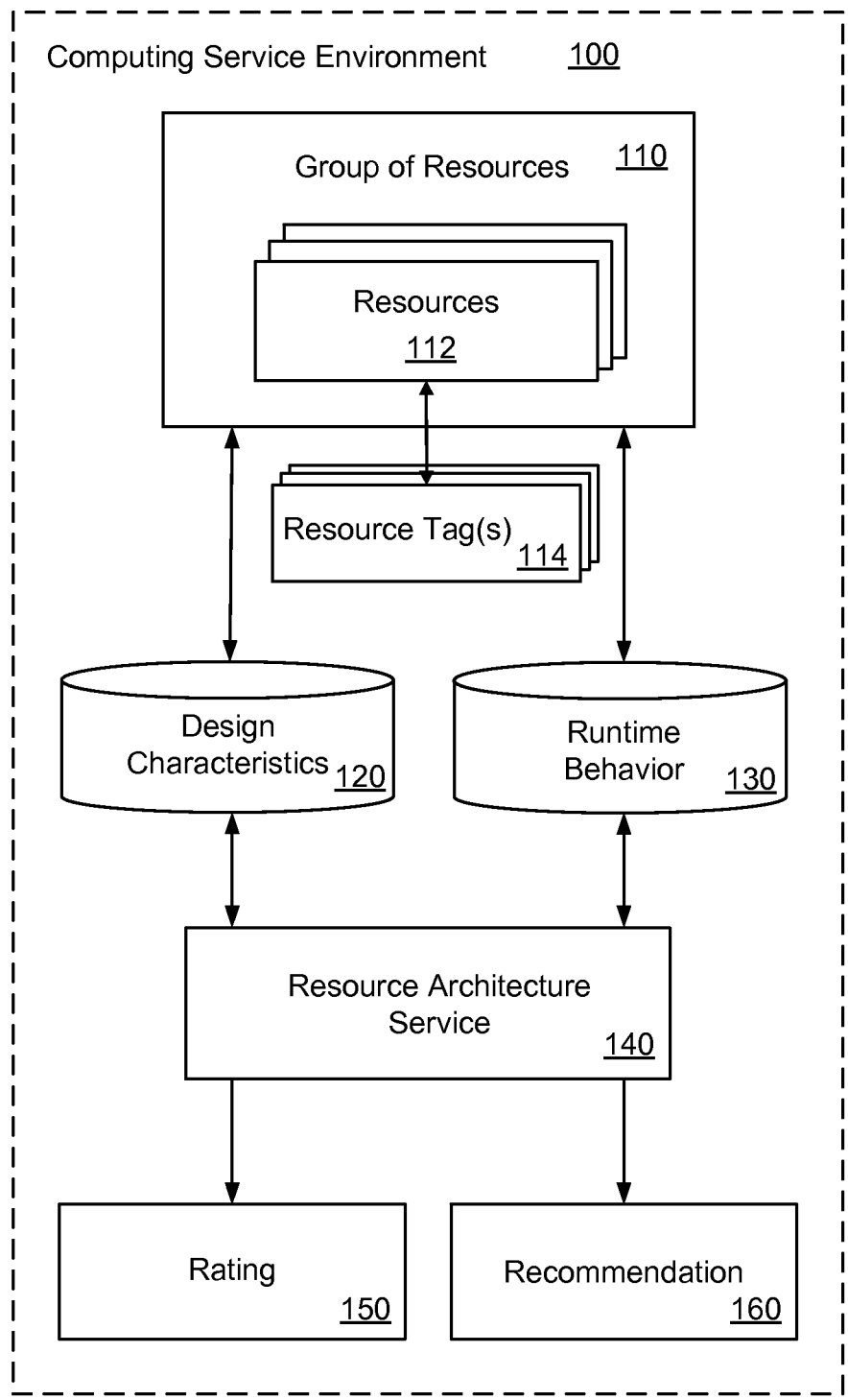
FIG. 1 illustrates a system and related operations for providing assessments of resource deployments in a computing service environment according to an example of the present technology.

A technology is described for evaluating a deployment of a group of resources in a computing service environment, and providing recommendations to improve the group of resources. The resources may include physical computing resources or virtualized computing resources. The group of resources may include a plurality of resources, such as computing instances, networking nodes, storage resources, connections to virtualized services, etc. The group of resources may be architected according to a defined configuration. A resource architecture service may evaluate a current architecture of the group of resources based on design characteristics of the group and runtime behavior of the group. In addition, the resource architecture service may evaluate the group by comparing the group to model systems or other customer systems in a related industry. Based on this evaluation, the resource architecture service may determine a rating for the group that indicates a quality level of the architecture for the group. The resource architecture service may provide recommendations to improve the architecture of the group of resources. For example, the resource architecture service may recommend alternative resource configurations to improve the design characteristics and/or the runtime metrics of the group, thereby improving the rating for the group.

In one configuration, a customer may tag resources being utilized by the customer. The resources may include computing instances being executed on behalf of the customer in the computing service environment. The resources may include compute resources, storage resources, networking resources, database resources, etc. In one example, the customer may be provided with a set of preexisting tags, and the customer may tag each resource with one of the preexisting tags. The tags may indicate that a particular resource or resource type is being used by the customer and may indicate a particular purpose for which the resource is being used. For example, a tag for a resource (e.g., a virtualized processing node) may include a resource name provided by a customer, a resource type, a resource identifier (ID), a geographical location, security groups, network addresses, mapped services, other attributes, etc.

In one example, the tags associated with the resources may be provided to the resource architecture service. The resource architecture service may define the group of resources to include the resources that are tagged by the customer. Therefore, the group of resources may be associated with a single customer. The group of resources may be defined as a set of tags created by a customer for a period of time. In an alternative configuration, the resource architecture service may not define the group of resources based on the set of tags. Rather, the resource architecture service may automatically discover which resources are being utilized by the customer without the use of tags or the resource architecture may create the tags. For example, the customer may provide the resource architecture service with customer account information, which describes resources, applications, services, etc. being used by the customer. Based on the customer account information, the resource architecture service may detect other resources that are being explicitly or implicitly utilized in the computing service environment. Therefore, the resource architecture service may define the customer's group of resources to include these other resources. In other words, the resource architecture service may automatically discover dependent resources being used by the customer.

In one configuration, the resource architecture service may determine a rating for the group of resources. The rating may be an assessment of a deployment of the group of related resources with respect to a predefined set of best practice guidelines. The predefined set of best practice guidelines may be related to security, reliability, performance efficiency and cost optimization. In other words, the rating may indicate an architectural quality level of the group with respect to security, reliability, performance efficiency and cost optimization. The rating may also be referred to as a maturity score that indicates an architectural maturity level of the group. The rating may be determined according to a numeric rating scale (e.g., 0 to 100). In one example, the resource architecture service may determine the rating based on design characteristics of the group. The design characteristics may relate to reliability of the group, security of the group, performance efficiency of the group and cost reduction for executing the group in the service environment. In addition, the resource architecture service may determine the rating based on runtime behavior of the group. The runtime behavior may indicate runtime metrics associated with the group and/or runtime problems associated with the group. One example of runtime problems may include trouble tickets. Trouble tickets may be used to track the detection, reporting and/or resolution of problems for the group of resources. In addition, the runtime behavior may include external reports related to performance of the group of related resources that are generated during runtime of the group of related resources. The rating for the group may be adjusted based on whether or not the group meets various criteria with respect to the design of the group and the runtime behavior of the group. In one configuration, the rating may include a separate numerical value for various criteria used to assess the deployment of the group of resources. For example, the rating may include a first numerical value to assess the group's reliability, a second numerical value to assess the group's security, etc.

In one configuration, the resource architecture service may determine the rating for the group of resources based on a comparison between the group and model systems with model ratings. The resource architecture service may determine a reduced rating when components in model systems are absent from the group of resources, and the resource architecture service may determine an increased rating when components in model systems are included in the group of resources (e.g., useful components are matched between the systems). Similarly, the resource architecture service may compare the group of resources to other customer systems in related or similar industries, and adjust the rating based on the comparison.

Based on the rating for the group, the resource architecture service may provide resource configuration recommendations to improve the rating. For example, the resource architecture service may provide alternative resource configurations to improve the architecture of the group, thereby improving the rating for the group. The resource configuration recommendation may improve various design elements of the group with respect to reliability, security, performance efficiency and cost. In addition, the resource configuration recommendation may improve the runtime behavior of the group of resources, which may result in improved runtime metrics and a reduced number of problems during runtime. In one example, the resource configuration recommendation may include suggestions to incorporate features of the model systems or the other customer systems that are absent from the group of resources. Non-limiting examples of the resource configuration recommendation may include a recommendation to launch additional resources that are included in the group, a recommendation to terminate certain resources, a recommendation to add security features to the group, or a recommendation to balance a load across the group. Each of these recommendations may set forth a modified architecture for the group, which may improve the rating for the group of resources.

In one configuration, the resource architecture service may include a testing tool for testing the group of resources. The testing tool may test the group for failures by systematically removing components of the group to simulate or apply failures in the group. The testing tool may determine performance metrics for the group when the components are removed. In another example, the testing tool may perform load testing on the group by injecting or simulating an increased load on the group. The testing tool may determine performance metrics for the group when the group is subject to the increased load. Therefore, the testing tool may be used to run a series of tests on the group to determine the group's availability, fault tolerance, scalability, etc.

In one example, an application with functionality for evaluating the deployment of the group of resources (e.g., determine ratings and/or recommendations for the groups of resources) may be installed on a mobile computing device. The mobile computing device may include, for example, a universal serial bus (USB) memory drive. The mobile computing device may be plugged into a data center that includes a plurality of servers that execute a plurality of resource groups. After the mobile computing device is connected to the data center, the deployment of the groups of resources that are located in the data center may be evaluated using the application installed on the mobile computing device.

FIG. 1 illustrates an exemplary system and related operations for providing assessments of resources 112 in a computing service environment 100. In particular, a resource architecture service 140 may assess an architectural quality level or maturity level of the resources 112 with respect to a predefined set of best practice guidelines, and provide recommendations to improve the architectural quality level. The resources 112 may include physical computing resources or virtualized computing resources. The resources 112 may be grouped together to form a group of resources 110. In one example, the resources 112 may be computing instances that are being executed in the computing service environment 100. Each resource 112 may be associated with a resource tag 114. The resource tag 114, which may be selected or defined by a customer, may describe or characterize the resource 112. The group of resources 110 may be defined to include related resources 112 that correspond to a set of resource tags 114, as selected by the customer. For instance, an electronic page server may be used by a data store server to build electronic pages to send to customers over the internet.

In one example, design characteristics and runtime behavior for the group of resources 110 may be determined. The design characteristics may relate to reliability, security, performance efficiency and/or cost optimization with respect to the group of resources 110. The runtime behavior may relate to runtime metrics and/or runtime problems with the group of resources 110. The design characteristics and runtime behavior may be provided to the resource architecture service 140. The resource architecture service 140 may use the design characteristics and the runtime behavior to determine a rating 150 (or maturity score) for the group of resources 110. The rating 150 may indicate the architectural quality level of the group with respect to the predefined set of best practice guidelines (e.g., cost optimization, reliability, security and performance efficiency). The rating 150 may be determined according to a numeric rating scale (e.g., 0 to 100) or another scale (e.g. symbolic or letters). In one configuration, the resource architecture service 140 may provide a recommendation 160 to improve the group's architecture quality based on the rating 150. The recommendation 160 may include alternative resource configurations for improving the group's design characteristics and/or runtime behavior with respect to the predefined set of best practice guidelines, thereby leading to an increased rating 150.

As a non-limiting example, the resource architecture service 140 may analyze a particular group 110 for a customer to determine the group's design characteristics 120 and/or runtime behavior. The resource architecture service 140 may determine that the customer is paying to execute a number of computing instances that are not being sufficiently utilized. The resource architecture service 140 may determine a rating of 65, on a scale from 0 to 100, in part due to the group's inefficiency in running the computing instances. The resource architecture service 140 may determine configuration changes to the group's architecture to reduce the number of computing instances, thereby reducing the customer's cost. As a result, the modified configuration of the group 110 may result in an improved rating of 80.

In a more specific example, a distributed application for serving electronic pages may be analyzed. The application may include five computing instances hosting five page servers (e.g., web page servers) using the Linux operating system and two data store servers that the page servers may query to obtain files, components and content for the electronic pages. The distributed application may be analyzed for performance efficiency, and the performance identified when using measured metrics may be 60 out of 100 because the databases are performing slowly in comparison to the large number of queries the page servers are receiving and so pages are being returned one half as fast as the pages are desired to be returned. Thus, the recommendation may be to switch the data stores over to a cluster database with five database servers. As a result of this change, the efficiency of the group of resources may be improved.

In another more specific example, the five page servers for the distributed application may be analyzed for security and cost optimization. A security level identified when using measured metrics may be 70 out of 100 because the page servers may have reduced security features. In addition, a cost optimization level identified when using measured metrics may be 50 out of 100 because not all of the five page servers are being utilized. Thus, a first recommendation may be to incorporate a firewall to improve the security level for the five page servers. In addition, a second recommendation may be to terminate one of the five page servers to improve the cost optimization level.

In another more specific example, a video distribution application may be analyzed. Measured metrics with respect to security, reliability, cost optimization and performance efficiency may be identified for the video distribution application. Based on the measured metrics, various recommendations may be provided. For example, the recommendations may be to add a firewall, switch to a cluster database to reduce a likelihood of crashing for the video distribution application, remove servers that are being underutilized to reduce operating costs, add servers to reduce overload, etc.

Figure 2:
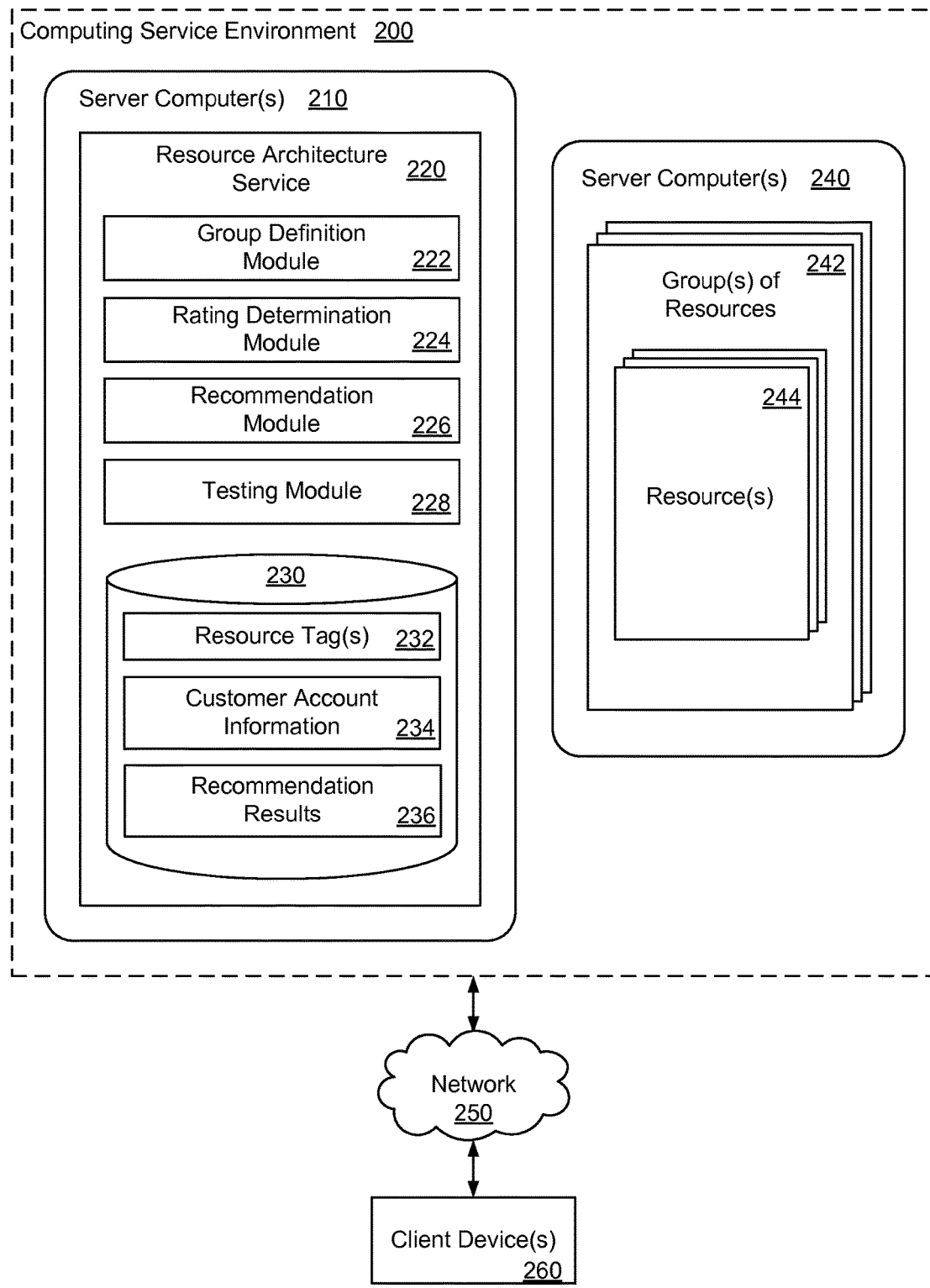
FIG. 2 is an illustration of a networked system in a service provider environment for providing assessments of resource deployments in a computing service environment according to an example of the present technology.

FIG. 2 illustrates components of an example computing service environment 200 according to one example of the present technology. The computing service environment 200 may include a server computer 210 in communication with a number of client devices 260 via a network 250. The server computer 210 may operate a resource architecture service 220. The server computer 210 may contain a data store 230 and a number of modules to assess a deployment of a group of resources 242. In addition, the computing service environment 200 may include a number of server computers 240 that are running the group(s) of resources 242. The group of resources 242 may include a plurality of resources 244. The resources 244 may include virtualized computing resources or physical computing resources. For example, the resources 244 may include computing instances and/or storage resources. Each group of resources 242 that operates on the server 240 may be associated with a particular customer. In other words, on the server 240, the group of resources 242 for the customer may be isolated or separated from other groups of resources 242 that are associated with other customers. The server computers 240 may communicate using a virtual network that is an overlay on an actual computing service network. In one configuration, the resource architecture service 220 and the groups of resources 242 may operate on the same server instead of on separate servers.

The data stored in the data store 230 may include resource tags 232. The resource tags 232 may be associated with the group of resources 242. The group of resources 242 may also be referred to as a work group. In other words, each resource 244 that is included in the group 242 may be associated with a resource tag 232. Each resource tag 232 may describe or characterize a particular resource 242 in the group of resources 242. For example, the resource tag 232 may identify a particular resource 242 as being a compute resource, a storage resource, a network resource or a database resource. The resource tag 232 may identify the resource 242 as being used for a particular application or service. In one example, a set of resource tags 232 may be associated with one customer, and the set of resource tags 232 may represent a group of resources 242 associated with that customer. In one configuration, the resource tags 232 may be selected by the customer when the customer is tagging their resources 244.

The data stored in the data store 230 may include customer account information 234. The customer account information 234 may be for a customer associated with the group of resources 242. The customer account information 234 may include identity information for the customer and an account number. The customer account information 234 may include resources, applications, services, etc. being used by the customer. The customer account information 234 may be used to define the group of resources 242 to include the resources 244.

The data stored in the data store 230 may include recommendation results 236. The recommendation results 236 may include a detailed description of past recommendations that were provided to a customer. The recommendations may be to help the customer improve an existing configuration or architecture of the group of resources 242 that are associated with the customer. For example, the recommendations may suggest for the customer to add resources 244, remove resources 244, etc. to the group of resources 242 in order to improve the group of resources 242 in terms of performance efficiency, security, reliability, cost, etc. The recommendation results 236 may include a series of recommendations that were provided to the customer over a period of time. The recommendation results 236 may be accessible to the customer. Therefore, the customer may view past recommended configurations for the group of resources 242.

The server computer 210 may include a group definition module 222, a rating determination module 224, a recommendation module 226, a testing module 228, and other applications, services, processes, systems, engines, or functionality not discussed in detail herein. The group definition module 222 may be configured to define the group of resources 242 including the resources 244. In one configuration, a set of resource tags 232 for the resources 244 may be received from the customer, and the group definition module 222 may define the group of related resources 242 based on the set of resource tags 232. The group of related resources 242 may be defined as a set of resource tags 232 which may change over a period of time. In other words, the group definition module 222 may not define the group of related resources 242 as a fixed set of resources. Rather, the determination of the resources 244 in the group 242 may be fluid since the individual resources 242 that are being used may change over time.

In another configuration, customer account information 234 may be received that identifies the resources 244 being used by the customer. Other resources in the computing service environment 200 that are dependent on or linked to the resource 244 indicated in the customer account information 234 may be identified. For example, if the customer account information 234 indicates that the customer is executing a certain service, then a certain type of storage resource in the computing service environment 200 that is known to be used with that service may be identified. The group definition module 222 may define the group of resources 242 to include the other resources upon which on the resources 244 indicated in the customer account information 234 are dependent. In other words, the group definition module 222 may automatically discover or identify other resources that are dependent on or linked to the resources 244 being used by the customer. In this configuration, the group definition module 222 may define the group 242 without the use of the computing resource tags 232, or alternatively, the group definition module 222 may use a combination of the resource tags 232 and an automated discovery technique.

The rating determination module 224 may be configured to determine a rating for the group of related resources 242. The rating may indicate an assessment of a deployment of the group of related resources 242 with respect to a predefined set of best practice guidelines (e.g., reliability, security, performance efficiency and cost). In one configuration, the rating determination module 224 may determine the rating based on design characteristics of the group of related resources 242 and/or the runtime behavior of the group of related resources 242. The design characteristics may relate to the reliability of the group 242, security of the group 242, performance efficiency of the group 242 and cost reduction for executing the group 242 in the computing service environment 200. The runtime behavior may include runtime metrics associated with the group 242 and/or runtime problems associated with the group 242. For example, the rating may be determined according to a numeric rating scale (e.g., 0 to 100). The rating determination module 224 may determine an increased rating or a reduced rating for the group 242 based on whether or not the group 242 meets various criteria with respect to the design of the group 242 and the runtime behavior of the group 242. In addition, the rating determination module 224 may determine the rating based on a comparison between the group 242 and model systems with model ratings. Based on components in the model systems that are included or absent in the group 242, the rating determination module 224 may adjust the rating for the group 242. In one example, the rating may be accompanied by a report indicating which characteristics of the group 242 contributed to the group's rating.

The recommendation module 226 may be configured to provide a resource configuration recommendation based on the rating of the group 242. The resource configuration recommendation may include alternative resource configurations to improve the architecture of the group 242, thereby improving the group's rating. The resource configuration recommendation may improve various elements of the group's design with respect to reliability, security, performance efficiency and cost. In addition, the resource configuration recommendation may improve the group's runtime behavior, which may result in improved runtime metrics and a reduced number of problems during runtime. The recommendation module 226 may provide at least one of: a recommendation to launch additional resources 244 that are included in the group 242, a recommendation to terminate certain resources 244 that are included in the group 242, a recommendation to add resources to the group 242 or remove resources from the group 242, a recommendation to add security features to the group 242, or a recommendation to balance a load across the group 242. As a non-limiting example, the recommendation module 226 may recommend that additional security features be incorporated into the group of resources 242 when the rating for the group 242 and/or the report accompanying the rating indicates that the group 242 has a relatively high likelihood to be attacked due to group's insufficient security features.

The testing module 228 may be configured to perform testing on the group of resources 242. In one example, the testing module 228 may test the group 242 for failures by systematically removing components of the group 242 to simulate failures in the group 242, and the testing module 228 may determine performance metrics for the group 242 when the components are removed. In another example, the testing module 228 may perform load testing on the group 242 by injecting or applying an increased load on the group 242, and the testing module 228 may determine performance metrics for the group 242 when the group 242 is subject to the increased load. Therefore, the testing module 228 may run a series of tests on the group 242 to determine the group's availability, fault tolerance, scalability, etc.

The client device 260 may be utilized by a customer to request an assessment of a configuration or architecture of the group of resources 242. For example, the client device 260 may be utilized to request a rating associated with the group of resources 242 and/or request resource configuration recommendations to improve the rating associated with the group of resources 242. The client device 260 may include any device capable of sending and receiving data over the network 250. The client device 260 may comprise, for example a processor-based system such as a computing device. The client device 260 may be a device such as, but not limited to, a desktop computer, laptop or notebook computer, tablet computer, mainframe computer system, handheld computer, workstation, network computer, or other devices with like capability.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 250 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
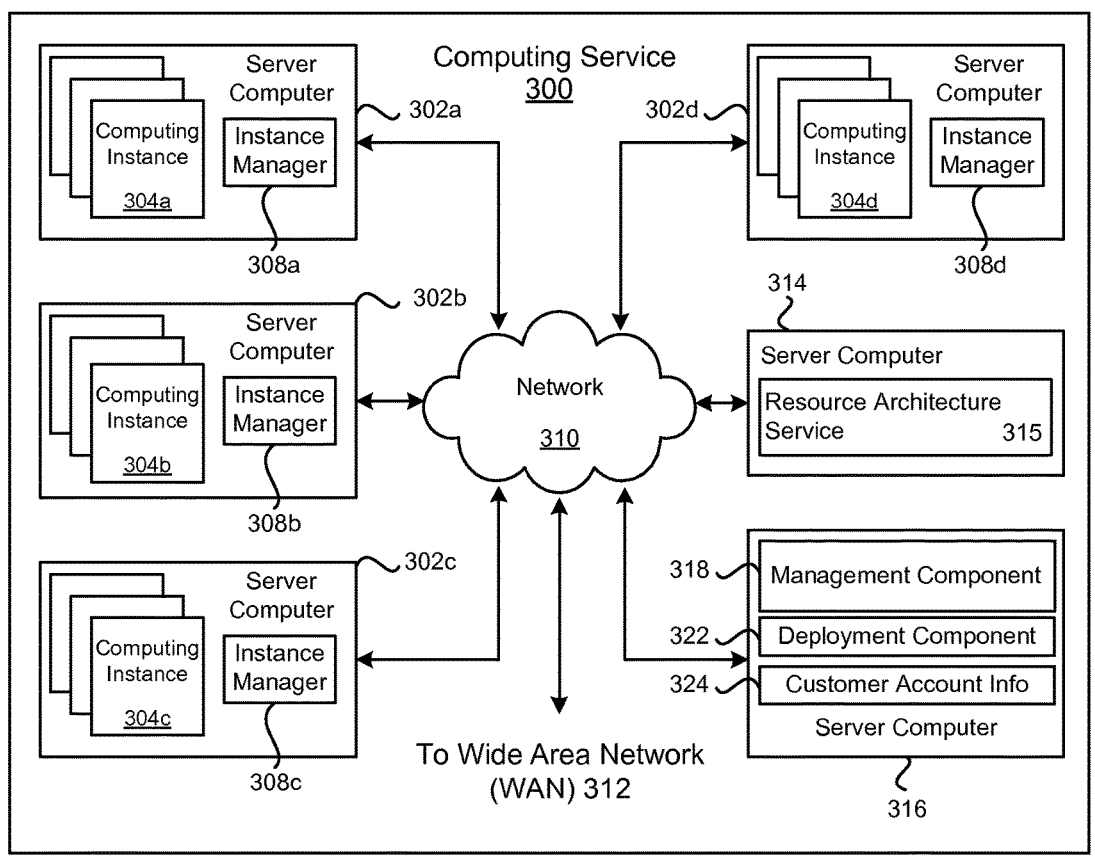
FIG. 3 is a block diagram of a computing service environment according to an example of the present technology.

FIG. 3 is a block diagram illustrating an example computing service 300 that may be used to execute and manage a number of computing instances 304a-d upon which the present technology may execute. In particular, the computing service 300 depicted illustrates one environment in which the technology described herein may be used. The computing service 300 may be one type of environment that includes various virtualized service resources that may be used, for instance, to host computing instances 304a-d.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of server computers 302a-d. The server computers 302a-d may also be known as physical hosts. While four server computers are shown, any number may be used, and large data centers may include thousands of server computers. The computing service 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-d capable of executing the instances. The instance manager 308a-d may be a hypervisor, virtual machine manager (VMM), or another type of program configured to enable the execution of multiple computing instances 304a-d on a single server. Additionally, each of the computing instances 304a-d may be configured to execute one or more applications.

One or more server computers 314 and 316 may be reserved to execute software components for implementing the present technology or managing the operation of the computing service 300 and the computing instances 304a-d. For example, the server computer 314 may execute a computing resource architecture service 315. The resource architecture service 315 may define a group of related resources, such as computing instances 304a-d. The resource architecture service 315 may identify design characteristics of the group of related resources. The resource architecture service 315 may identify a runtime behavior of the group of related resources. The resource architecture service 315 may determine a rating for the group of related resources based on the design characteristics and the runtime behavior of the group of related resources. In addition, the resource architecture service 315 may provide a resource configuration recommendation to improve the rating for the group of related resources.

A server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d.

A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304a-d may be configured. For example, the configuration may include an operating system, provide one or more applications to be installed in computing instances 304a-d, provide scripts and/or other types of code to be executed for configuring computing instances 304a-d, provide cache logic specifying how an application cache should be prepared, and other types of information. The deployment component 322 may utilize the customer-provided configuration and cache logic to configure, prime, and launch computing instances 304a-d. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302a-d, 316. The network 310 may be a local area network (LAN) and may be connected to a Wide Area Network (WAN) 312 or the Internet, so that end customers may access the computing service 300. In addition, the network 310 may include a virtual network overlaid on the physical network to provide communications between the servers 302a-d. The network topology illustrated in FIG. 3 has been simplified, as many more networks and networking devices may be utilized to interconnect the various computing systems disclosed herein.

Figure 4:
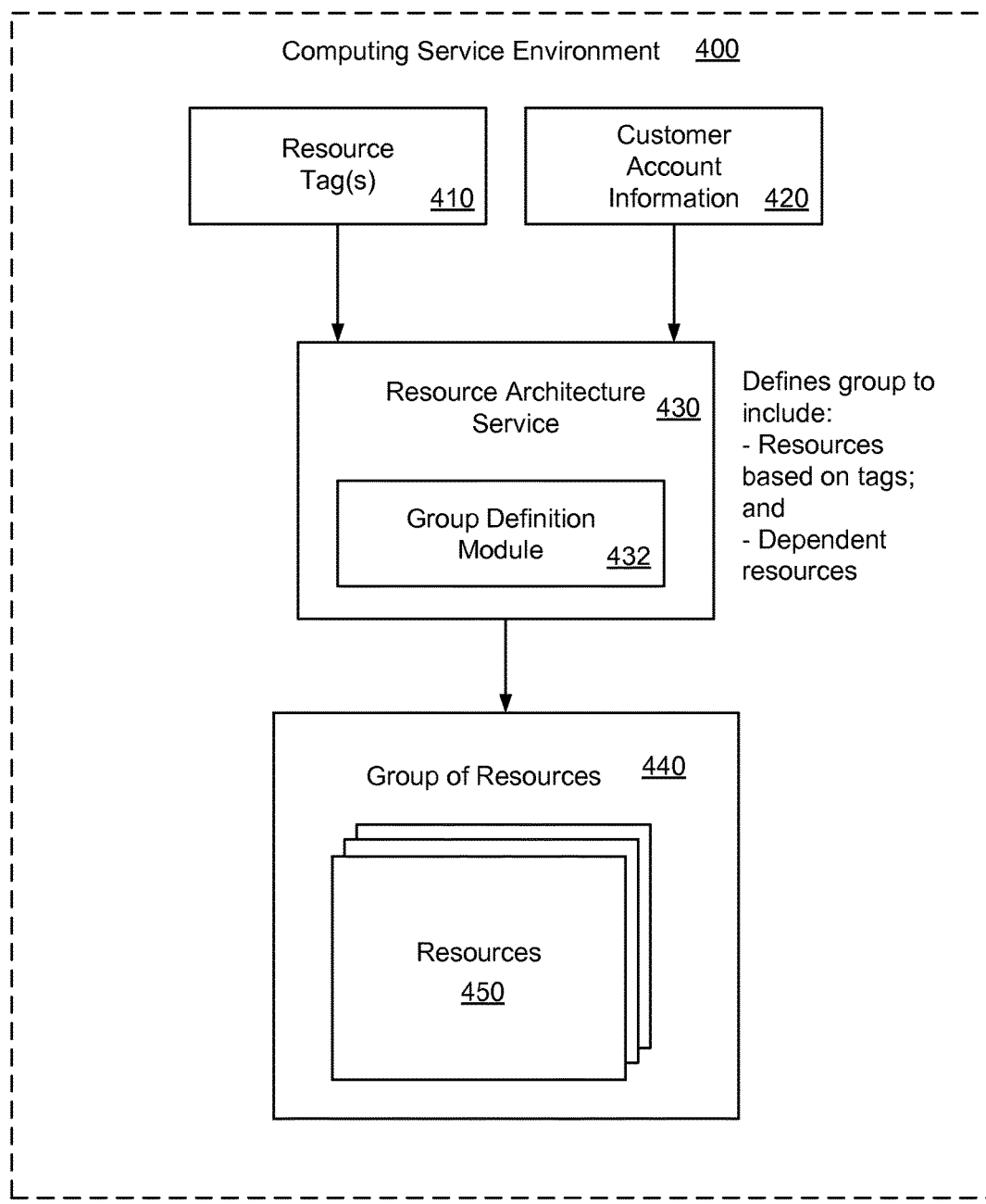
FIG. 4 illustrates a system and related operations for defining a group of related resources in a computing service environment according to an example of the present technology.

FIG. 4 illustrates an exemplary system and related operations for defining a group of related resources 440 in a computing service environment 400. The resources 440 may include virtualized computing resources or physical computing resources. In one configuration, the group of related resources 440 may be defined based on resource tags 410 associated with resources 450 in the computing service environment 400. For example, a customer may tag or attach labels to the resources 450 being used by the customer. The resources 450 may include compute resources, storage resources, network resources, database resources, etc. The compute resources may include computing instances, load balancers, independent function processing, etc. The storage resources and the database resources may include memory and data storage services for storing data in structured, less structured or comparatively unstructured formats. The network resources may include virtualized networking including firewalls, gateways, virtual route tables, virtual subnets, etc. As a non-limiting example, the customer may assign tags to resources 450 used for product development, resources 450 used to execute an application and/or resources 450 used to store data associated with the application. The customer may tag each of the resources 450 being used by the customer. Each resource tag 410 may describe or characterize a corresponding resource 450. In one example, the customer may tag each of the resources 450 using a collection of preexisting resource tags. In other words, the customer may select one of the preexisting resource tags to assign to each resource 450. In another example, the resource tags 410 may be automatically assigned when the customer builds or assembles the resource architecture.

In one configuration, the customer may provide a set of resource tags 410 to a resource architecture service 430. The resource architecture service 430 may identify, via a group definition module 432, the resources 450 that correspond to the set of resource tags 410. The resource architecture service 430 may group these resources 450 together to form the group of related resources 440. The group of related resources 440 may also be referred to as a work group. The group definition module 432 may define the group of related resources 440 as the set of resource tags 410 identified for a period of time.

The group of related resources 440 may refer to a fluid set of resources 450, as opposed to a fixed set of resources 450 since the individual resources 450 that are being used by the customer may change over time. As the customers change applications and/or services that are being used by the work group for the workload (e.g., adding services or removing services), the resources 450 included in the group 440 may be continually adjusted. As a non-limiting example, the customer may add a security feature, such as a firewall computing instance, to their work group, and subsequently assign a resource tag 410 to the security feature. This resource tag 410 for the security feature may be incorporated into the group of resources 440 associated with the customer. As another non-limiting example, although the resources 450 associated with an auto scaling group may change over time, the resources 450 or computing instances that are added or "duplicated" due to auto scaling may be assigned the same resource tags 410 as previous similar or identical services. Similarly, resources 450 for specific applications and/or services that are similar or identical may be assigned the same resource tag 410, and as compute resources and storage resources are added and removed over time, these resources may be assigned the same resource tags 410.

In one configuration, the customer may provide customer account information 420 to the resource architecture service 430. The customer account information 420 may include resources, applications, services, etc. being used by the customer. Based on the customer account information 420, the group definition module 432 may detect resources in the computing service environment 400 that are being utilized by the customer. The group definition module 432 may define the group of resources 440 to include these resources. In other words, the group definition module 432 may automatically discover or identify other resources that are dependent on or linked to the resources currently being used by the customer. As a non-limiting example, the customer account information 420 may indicate compute resources for a media streaming application being executed in the computing service environment 400 for the customer, and based on this information, the group definition module 432 may identify computing instances and network resources that are used for the media streaming application. In this example, the group definition module 432 may use an automated discovery technique, as opposed to the resource tags 410, to define the group of resources 440.

In one configuration, the group definition module 432 may use both the resource tags 410 and dependent resources discovered based on the customer account information 420 when defining the customer's group. Upon the customer providing the resource tags 410 and/or the customer account information 420, the group definition module 432 may define or frame the customer's work group. As a non-limiting example, the customer may provide a set of resource tags 410, a customer account identifier, and an indication that the customer is using particular services in the computing service environment 400, and based on this information, the group definition module 432 may define or frame the customer's work group.

As a non-limiting example, the group definition module 432 may detect that a load balancer used to distributed requests across resources 450 (e.g., computing instances) and the resources 450 are both part of the customer's group 440. As another non-limiting example, the group definition module 432 may detect that a database accessed by resources 450 (e.g., computing instances) indicates that the database and the resources 450 are both part of the customer's group 440.

The group definition module 432 may also make requests to the control plane of the computing service environment 440 in order to discover dependent resources, discover which resources interact with each other, etc. In one example, the group definition module 432 may automatically discover added services being used by the customer. If the added services are related to preexisting services that are already tagged, the customer may have an option to apply the same resource tag 410 to the newly added service. More specifically, the resource architecture service 430 may capture a listing of API calls made to services or analyze a log of API calls made by a group of resource 440 in order to detect which related services are being used by the group of resources 440.

In one example, the resource architecture service 430 may provide a view of the entire group of resources 440. The group of resources 440 may include resources 450 for one customer account or for multiple accounts associated with the same customer. In addition, the group of resources 440 may provide a graphical architectural view of the various components (i.e., resources 450) that are included in the group 440. Each component and the dependencies between different components may be viewed in a graphical format for the group 440. In other words, the customer may be provided with a high level graphical view of their group of resources 440. While previous technologies have allowed one or a few resource to be viewed at a time, the present technology enables a group viewpoint of the entire resource architecture or resource infrastructure, which may allow for patterns to be identified across the entire group. In addition, the group viewpoint may reflect services that are added or removed from the customer's workload for a work group over a period of time. However, at a given point in time, the group viewpoint may provide a point-in-time snapshot of the customer's work group and related services and computing nodes.

Figure 5:
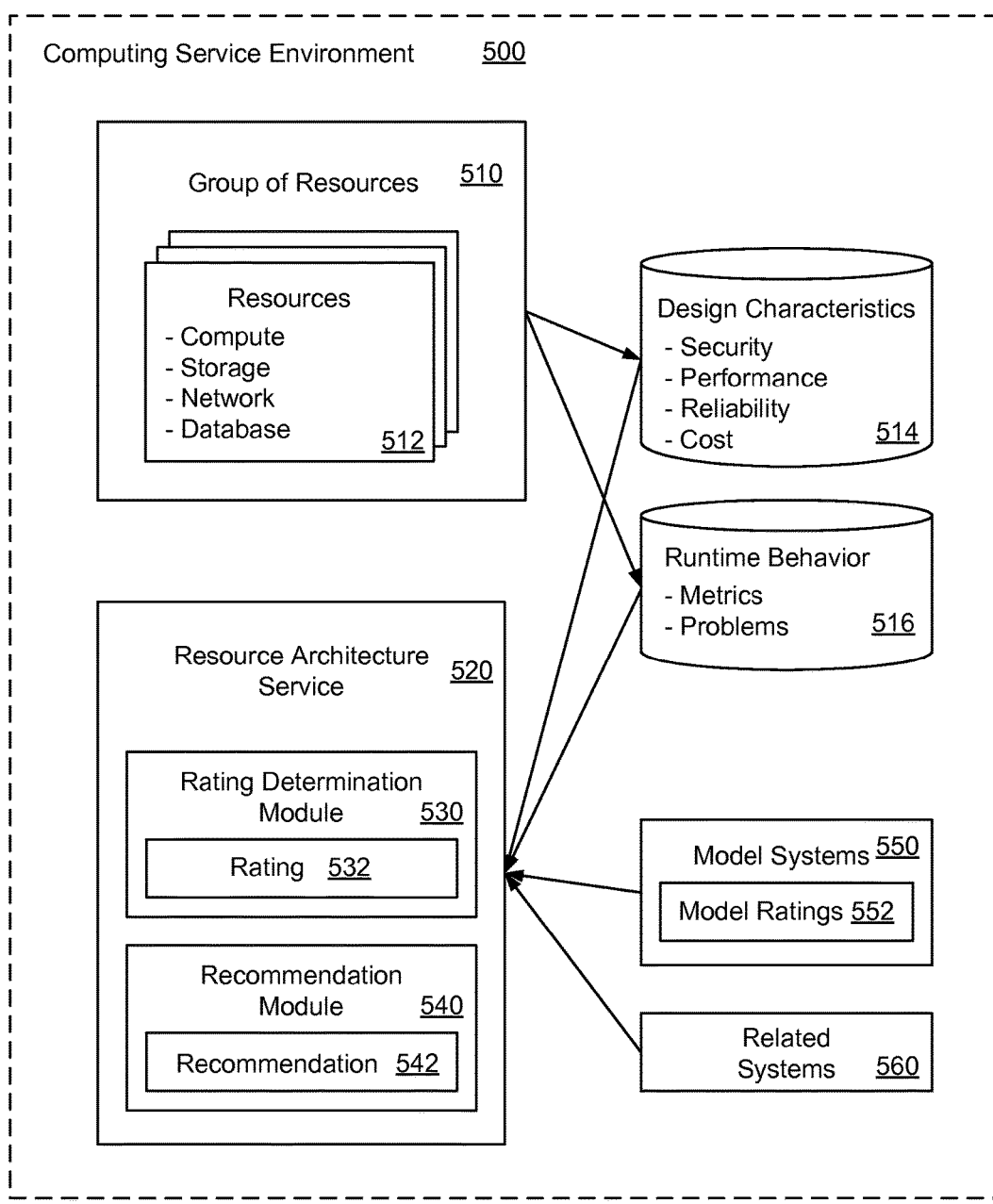
FIG. 5 illustrates a system and related operations for providing assessments of resource deployments in a computing service environment according to an example of the present technology.

FIG. 5 illustrates an exemplary system and related operations for providing assessments of deployments of resources 512 in a computing service environment 500. The assessments of the resources 512 may be performed by a resource architecture service 520 that operates in the computing service environment 500. The resources 512 may be part of a group of resources 510. The group of resources 510 may be associated with a customer with one customer account, or a customer with multiple customer accounts. The resources 512 may include computing instances, such as compute resources, storage resources, network resources, database resources, etc. The resources 512 may include virtualized computing resources or physical computing resources. The customer may utilize the resources 512 for a wide possibility of applications, such as digital media applications, content delivery, development and testing of workloads, e-commerce, Internet of Things (IOT), gaming, mobile services, digital marketing, databases, archiving, disaster recovery, etc. In one example, the resources 512 may be utilized in a development environment, a production environment or a testing environment.

The group of resources 510 may be set up in accordance with a defined configuration or architecture. In other words, the group 510 may be designed to have a certain number of resources with varying combinations of processing capability, memory, storage and networking capacity. The customer may design and build the group 510 according to a desired architecture or configuration. The computing service environment 500 may provide the customer with a flexible number of resource types when designing the group 510. The resource types may be tailored to fit different use cases for the customer (e.g. compute focused, input/output focused, database focused computing instances, etc.). Although the customer may have the freedom to choose an appropriate mix of resources based on the customer's application, the wide number of possible options may overwhelm the customer and result in the customer inefficiently designing the resources configurations. In other words, the customer may select a combination of resource types that are deficient in terms of security, performance efficiency, reliability, cost optimization, etc.

In the present technology, the resource architecture service 520 may function to evaluate or assess a deployment of the group of resources 510 with respect to a predefined set of best practice guidelines. The predefined set of best practice guidelines may be related to security, performance efficiency, reliability, cost optimization, etc. The predefined set of best practice guidelines may relate to design characteristics and runtime behavior of the group of resources 510. The resource architecture service 520 may determine a quality level of the resource's architecture or configuration with respect to the predefined set of best practice guidelines. Based on the assessment, the resource architecture service 520 may provide recommendations to improve the resource's architecture or configuration. Therefore, customers that set up a group of resources 510 in the computing service environment 500 may be notified about the group's analyzed quality level. The customers may also be provided with feedback regarding actionable steps to improve the group's analyzed quality level. For example, the resource architecture service 520 may recommend adding or removing services to the group 510, adding or removing features to the group 510, modifying the group's existing architecture or configuration, etc.

In one example, the resource architecture service 520 may identify design characteristics 514 of the group of resources 510. The design characteristics 514 may relate to decisions made by the customer during a design phase of the group of resources 510. In other words, the design characteristics 514 may describe the particular configuration or architecture used to create the group of resources 510. The design characteristics 514 may be related to reliability, security, performance efficiency and/or cost optimization with respect to the group of resources 510. Each design characteristic 514 may be associated with a predefined architectural template. Therefore, the resource architecture service 520 may compare each predefined architectural template with the group 510 when evaluating each design characteristic 514. In addition, the resource architecture service 520 may keep track of design decisions made for the group of resources 510 over a period of time. As a non-limiting example, the resource architecture service 520 may detect when a bastion host is incorporated into the group's architecture in order to improve security for the group 510. This history of design decisions may be available to the customer to allow the customer to be aware of the group's previous configurations. The customer may be allowed to access past versions of the group's configuration or architecture to view the previous design decisions.

In one example, the resource architecture service 520 may identify the runtime behavior 516 of the group of resources 510. In other words, the resource architecture service 520 may identify the group's behavior during a runtime or execution phase. The runtime behavior 516 may include runtime metrics associated with the group 510 and runtime problems associated with the group 510. The resource architecture service 520 may collect runtime metrics for each instantiation of the group 510. Similar to the design characteristics 514, the runtime metrics may relate to reliability, security, performance efficiency and/or cost optimization of the group 510 during runtime. The runtime metrics may also include business-level metrics, such as an amount of revenue generated by the group 510 and a number of users utilizing the group 510. Information on the group's runtime behavior 516 may be collected by the resource architecture service 520, or sourced from other areas. For example, user agents on specific nodes (e.g., resources 512) may provide the resource architecture service 520 with information on the group's runtime behavior 516. In another example, support teams may provide the resource architecture service 520 with information on the group's runtime problems (e.g., a list of trouble tickets for the group 510 during runtime).

In one configuration, the resource architecture service 520 may determine, via a rating determination module 530, a rating 532 for the group of resources 510. The rating 532 may also be referred to as a maturity score. The rating determination module 530 may determine the rating 532 based on the design characteristics 514 and the runtime behavior 516. The rating 532 may indicate an assessment (or maturity level) of the deployment of the group of related resources 510 with respect to the design characteristics 514 and the runtime behavior 516. In other words, the rating 532 may indicate a compliance level for the group 510 with respect to the predefined set of best practice guidelines (e.g., security, performance efficiency, reliability and cost). The rating 532 may be determined according to a numeric rating scale (e.g., 0 to 100). The rating determination module 530 may determine an increased rating 532 or a reduced rating 532 for the group 510 based on whether or not the group 510 meets the predefined set of best practice guidelines with respect to the design characteristics 514 of the group 510 and the runtime behavior 516 of the group 510. In one example, the rating 532 may be closer to 0 when the group 510 does not meet the predefined set of best practice guidelines and the rating 532 may be closer to 100 when the group 510 does meet the predefined set of best practice guidelines.

In one configuration, the rating determination module 530 may determine a reduced rating 532 when an existing configuration for the group of resources 510 results in: the group 510 being at an increased risk for security attacks, the group 510 being executed with reduced performance efficiency, the group 510 being executed with reduced reliability, and the group 510 being executed at an increased cost to the customer. The rating determination module 530 may determine an increased rating 532 when the existing configuration for the group of resources 510 results in: the group 510 being at a decreased risk for security attacks, the group 510 being executed with increased performance efficiency, the group 510 being executed with increased reliability, and the group 510 being executed at a reduced cost to the customer. In another configuration, the rating determination module 530 may determine the reduced rating 532 when the existing configuration for the group of resources 510 results in: an increased number of trouble tickets when the group 510 is executed during runtime or a decreased level of performance for the group 510 when executed during runtime. The rating determination module 530 may determine the increased rating 532 when the existing configuration for the group of resources 510 results in: a reduced number of trouble tickets when the group 510 is executed during runtime or an increased level of performance for the group 510 when executed during runtime.

In one example, specific components of the group 510 that result in the increased rating 532 or the reduced rating 532 may be indicated to the customer. In another example, the customer may submit potential group configurations to the rating determination module 530. The rating determination module 530 may provide the rating 532 to the customer based on the submitted configuration. In addition, the rating determination module 530 may provide the customer with a report describing which components of the group's architecture contribute to the rating 532.

In one example, the rating determination module 530 may keep track of the group's rating 532 over a period of time. Each time the group's architecture or configuration is modified, the rating determination module 530 may determine an updated rating 532 for the group 510. The ratings 532 for the group 510 over the period of time may be accessible to the customer. Therefore, the customer may keep track of the ratings 532 associated with previous configurations of the group 510.

In one example, the resource architecture service 520 may monitor the runtime behavior 516 for the group of resources 510 over a period of time, and determine how the design characteristics 514 affect the runtime behavior 516 based on data collected over the period of time. Based on knowledge gathered by the resource architecture service 520 over the period of time, the resource architecture service 520 may compute the rating 532. For example, the resource architecture service 520 may determine how a design decision to use a certain type of encryption for the group 510 affects the runtime behavior of the group 510 (i.e., whether the encryption improves the runtime behavior or degrades the runtime behavior). If the resource architecture service 520 determines that the type of encryption results in a favorable improvement to runtime behavior 516, then the rating 532 may be increased. As another example, the resource architecture service 520 may determine that a design decision of using two geographic zones for locating resources 510 leads to improved runtime performance, and therefore, the rating 532 for the group 510 may be increased. The resource architecture service 520 may observe the group's operational runtime behavior 516 with respect to other factors as well, such as reliability, security or cost. In yet another example, the group 510 may use a bastion host for security purposes. The resource architecture service 520 may compare other systems in the computing service environment 500 that use bastion hosts with systems that do not use bastion hosts, and based on the comparison, the resource architecture service 520 may determine that systems with bastion hosts are generally better protected from attacks as compared to systems without bastion hosts. Therefore, the rating 532 for the group 510 may be increased due to the utilization of the bastion host.

In one configuration, the resource architecture service 520 may determine the rating 532 for the group of resources 510 based on a comparison between the group 510 and model systems 550 with model ratings 552. The model systems 550 may be in a related industry with respect to the group of resources 510. The model systems 550 may serve as a benchmark for the group of resources 510. The rating determination module 530 may set a reduced rating 532 when components in the model systems 550 are absent from the group of resources 510. The rating determination module 530 may determine an increased rating 532 when components in the model systems 550 are included in the group of computing resources 510. Similarly, the group of resources 510 may be compared with related systems 560 in related industries that operate in the computing service environment 500. The rating determination module 530 may determine the rating 532 based on the comparison. Therefore, customers may baseline their group 510 against the related systems 560 in the same (or similar) industry.

In one configuration, the resource architecture service 520 may provide, via a recommendation module 540, a recommendation 542 to improve the group 510. In particular, the recommendation 542 may be regarding the group's configuration, which may lead to an improved rating 532. Based on the group's rating 532, as determined based on the design characteristics 514, the runtime behavior 516, and the comparison with the model systems 550 and the related systems 560, the recommendation module 540 may provide the customer with guidance on actions that may improve the rating 532. For example, the recommendation module 540 may provide alternative resource configurations to improve the architecture or configuration of the group 510 with respect to reliability, security, performance efficiency and cost. The alternative reconfigurations may include modifications to the group's current configuration or architecture. The modifications may include changes to the resources 512 (e.g., the compute, storage, network and database resources) in the group 510. The recommendation 542 may result in improvements to the group's design characteristics 514 and the group's runtime behavior 516, thereby leading to the improved rating 532.

In one example, the recommendation 542 may include suggestions to incorporate features or components of the model systems 550 or the related systems 560 that are absent from the group of resources 510. The recommendation 542 may include white papers, knowledge base articles, etc. with actionable steps to improve the group's rating 532. Non-limiting examples of the recommendation 542 may include a recommendation to launch additional resources 512 that are included in the group 510, a recommendation to terminate certain resources 512 that are included in the group 510, a recommendation to add security features to the group 510, a recommendation to balance a load across the group 510, or a recommendation to add certain applications or services to the group 510. Therefore, the recommendation 542 may include suggested modifications to the group's current configuration or architecture.

As a non-limiting example, the group of resources 510 may include resources 512 for a media streaming application that is running on the computing service environment 500. The resource architecture service 140 may analyze the group's architecture and determine that the group 510 employs a fixed number of resources 512. The resource architecture service 520 may look at traffic patterns for the media streaming application, and determine that the resources 510 are under-utilized during low times of traffic and over-utilized during peak times of traffic. As a result, during periods of reduced traffic, the cost to run the resources 512 may be wasteful due to the fixed number of resources 512. In addition, the computing resource architecture service 520 may compare the architecture of the group 510 to the architectures of related systems for media application streaming, and based on the comparison, the resource architecture service 520 may determine that a majority of related systems 560 employ a specific type of security feature. Based on an evaluation of the group's architecture or configuration, the resource architecture service 520 may determine a rating of 30 for the group 510, wherein the rating is on a scale from 0 to 100. The resource architecture service 520 may provide recommendations to the customer to improve the rating 532. For example, the resource architecture service 520 may recommend for the customer to employ an auto scaling feature to efficiently handle periods of increased user traffic and periods of reduced user traffic, which may also reduce wasteful costs to execute an unnecessarily high number of resources 512 when traffic is relatively low. The resource architecture service 520 may recommend the customer to add a security feature that is commonly used in the related systems 560. The resource architecture service 520 may inform the customer that the rating 532 for the group 510 may improve from 30 to 80 based on these changes. Therefore, the customer may improve their group 510 by incorporating the recommendations provided by the computing resource architecture service 520.

Figure 6:
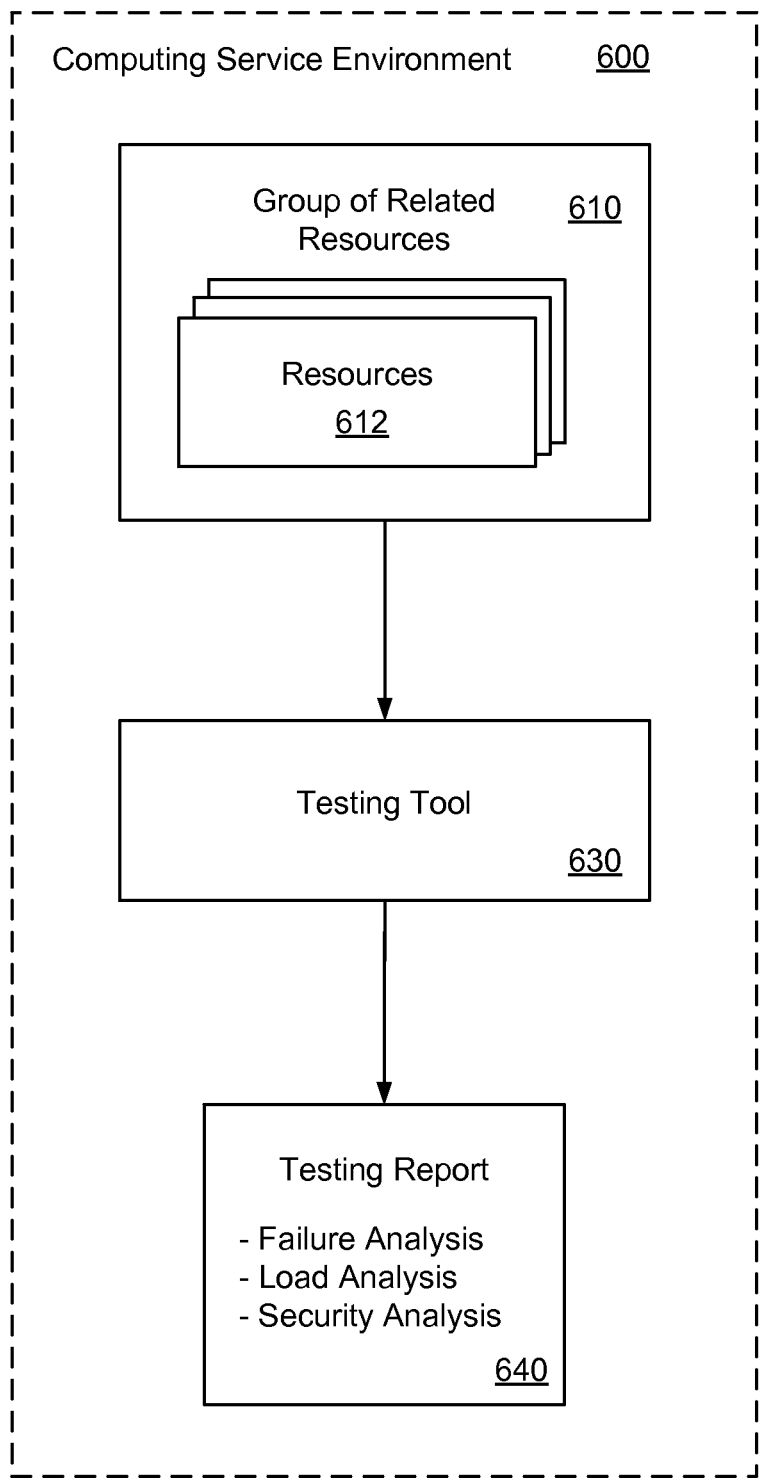
FIG. 6 illustrates a system and operations for testing a group of related resources according to an example of the present technology.

FIG. 6 illustrates an exemplary system and related operations for testing a group of related resources 610 in a computing service environment. The group of related resources 610 may include a group of resources 612. The resources 612 may include computing instances, such as compute resources, storage resources, network resources, database resources, etc. The group of related resources 610 may be tested using a testing tool 630 that operates in the computing service environment 600. In one example, the group 610 may be tested in a testing environment, rather than a development environment, so the testing does not affect the group 610 that is currently being run on the computing service environment 600. The testing tool 630 may run a series of tests over a period of time, and determine how the group 610 responds under these test conditions.

In one example, the testing tool 630 may perform load testing on the group 610. The testing tool 630 may apply an increased load on the group 610, and determine performance metrics of the group 610 when the group 610 is subject to the increased load. The performance metrics may indicate an amount of time the group 610 takes to respond to the increased load (e.g., scale up due to the increased load). The testing tool 630 may determine whether a cost threshold for the group 610 may be exceeded due to the increased load. If the testing tool 630 determines that the group 610 may perform poorly when subject to the increased load, then the customer may be provided with recommendations to improve the group's architecture, which may lead to improved performance of the group 610 when subject to the increased load.

In one example, the testing tool 630 may test the group of related resources 610 for failures. The testing tool 630 may systematically remove components of the group 610 (e.g., various resources 612). The testing tool 630 may determine performance metrics of the group 610 when the components are removed from the group 610. Therefore, the customer may gain knowledge on how the group 610 performs in the event of a failure. In one example, the testing tool 630 may test the group 610 for network partition failures or network link outages that may cause timeouts or overloads. In other words, the testing tool 630 may purposely partition the network and determine the performance metrics for the group 610 under these conditions. If the testing tool 630 determines that the group 610 may break down or perform poorly when subject to particular failures, then the customer may be provided with recommendations to improve the group's architecture, which may lead to improved performance of the group 610 when subject to the failures. In other words, the group 610 may be better equipped to function even when the failures occur.

In one example, the testing tool 630 may test the group of related resources 610 for security issues. The testing tool 630 may test the group of related resources 610 to ensure that the group of related resources 610 provides confidentiality (e.g., non-disclosure of personal information), authentication features (e.g., confirmation of a user's identity), authorization features (e.g., confirmation that a user is allowed to access a service), etc. In one example, the testing tool 630 may perform a vulnerability assessment or a security assessment to assess the security features of the group of related resources 610. In another example, the testing tool 630 may perform a penetration test in order to simulate an attack on the group of related resources 610 by a malicious party.

In one example, the testing tool 630 may provide a testing report 640 to the customer. The testing report 640 may include a review of the security features of the group of related resources 610 and/or estimated performance metrics when the group of related resources 610 is subject to security attacks. The testing report 640 may include the performance metrics for when the group 610 is subject to the increased load. The testing report 640 may include the performance metrics for when the group 610 is subject to failure conditions. In addition, the testing report 640 may include the recommendations to improve the group's architecture in light of the group's performance when subject to the increased load and/or failure conditions.

Figure 7:
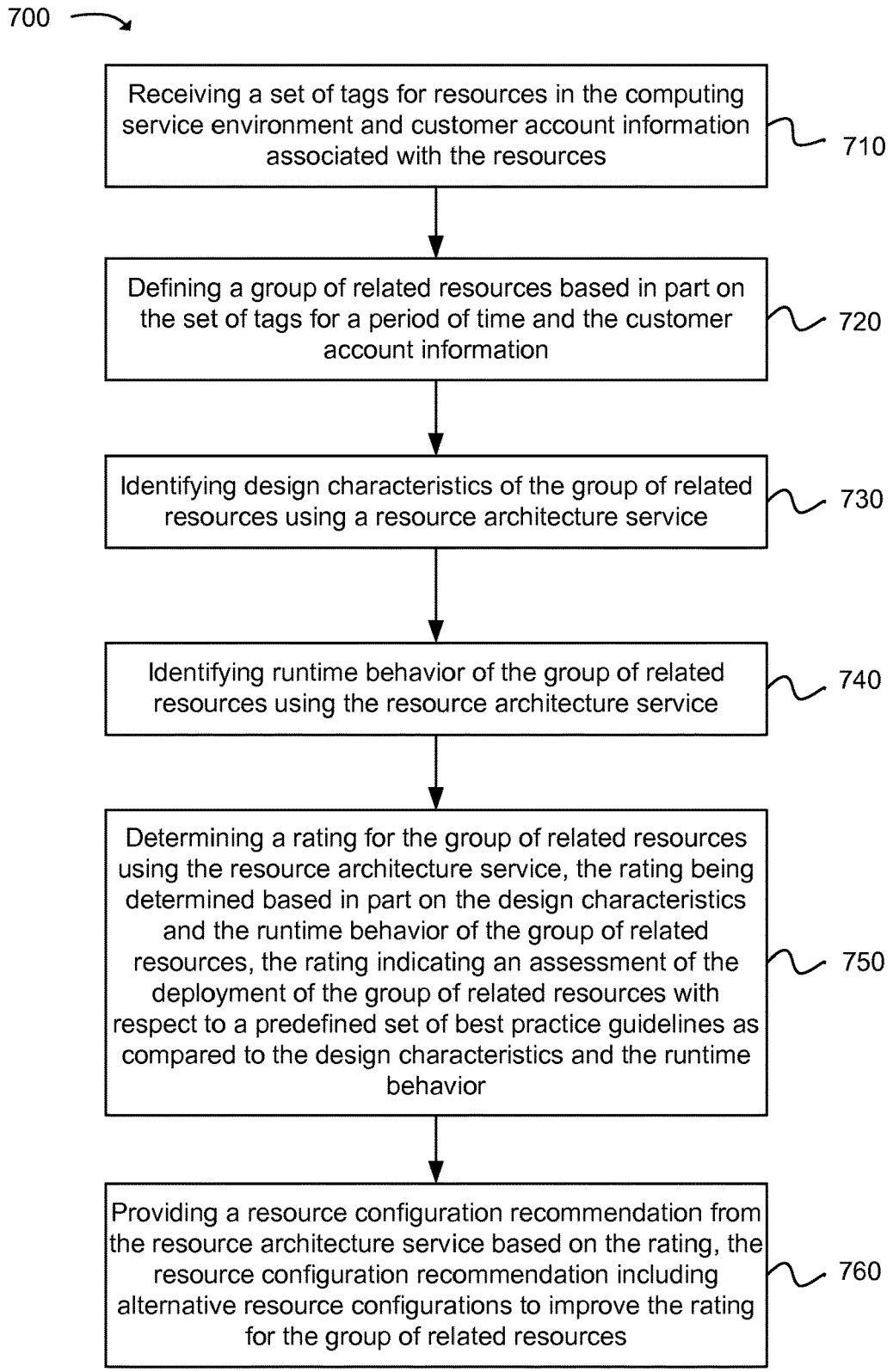
FIG. 7 is a flowchart of an example method for providing assessments of resource deployments in a computing service environment.

FIG. 7 illustrates an example of a method for providing assessments of computing resource deployments in a computing service environment. In one example, the deployment of the resources may be assessed using a resource architecture service that operates in the computing service environment. A set of tags for resources in the computing service environment and customer account information associated with the resources may be received, as in block 710. For example, a customer may tag each of the resources using a collection of preexisting tags, and then provide the set of tags for the resources.

A group of related resources may be defined based in part on the set of tags over a period of time and the customer account information, as in block 720. In other words, the resources identified by the set of tags may be grouped together to form the group of related resources. In one example, the group of related resources may include resources identified in the customer account information.

Design characteristics of the group of related resources may be identified using a resource architecture service, as in block 730. The design characteristics of the group of related resources may relate to reliability of the group, security of the group, performance efficiency of the group and cost reduction for executing the group in the computing service environment.

Runtime behavior of the group of related resources may be identified using the resource architecture service, as in block 740. The runtime behavior may include runtime metrics associated with the group of related resources, runtime problems associated with the group of related resources and external reports related to performance of the group of related resources that are generated during runtime of the group of related resources.

A rating for the group of related resources may be determined using the resource architecture service, as in block 750. The rating may be determined based in part on the design characteristics and the runtime behavior of the group of related resources. The rating may indicate an assessment of the deployment of the group of related resources with respect to a predefined set of best practice guidelines. In one configuration, the group of related resources may be compared to a set of model systems with model ratings in order to determine the rating for the group of related resources. The comparison may indicate components in the set of model systems that are absent from the group of related resources.

A resource configuration recommendation may be provided from the resource architecture service, as in block 760. The resource configuration recommendation may be determined based on the rating for the group of related resources. The resource configuration recommendation may include alternative resource configurations to improve the rating for the group of related resources. In one example, the resource configuration recommendation may include a suggestion to incorporate components from the model systems that are currently absent in the group of related resources.

In one configuration, the group of related resources may be tested for failures using a testing tool. During testing, the testing tool may remove or impair components of the group to apply failures in the group. The testing tool may determine performance metrics for the group when the components of the group are removed or impaired.

Figure 8:
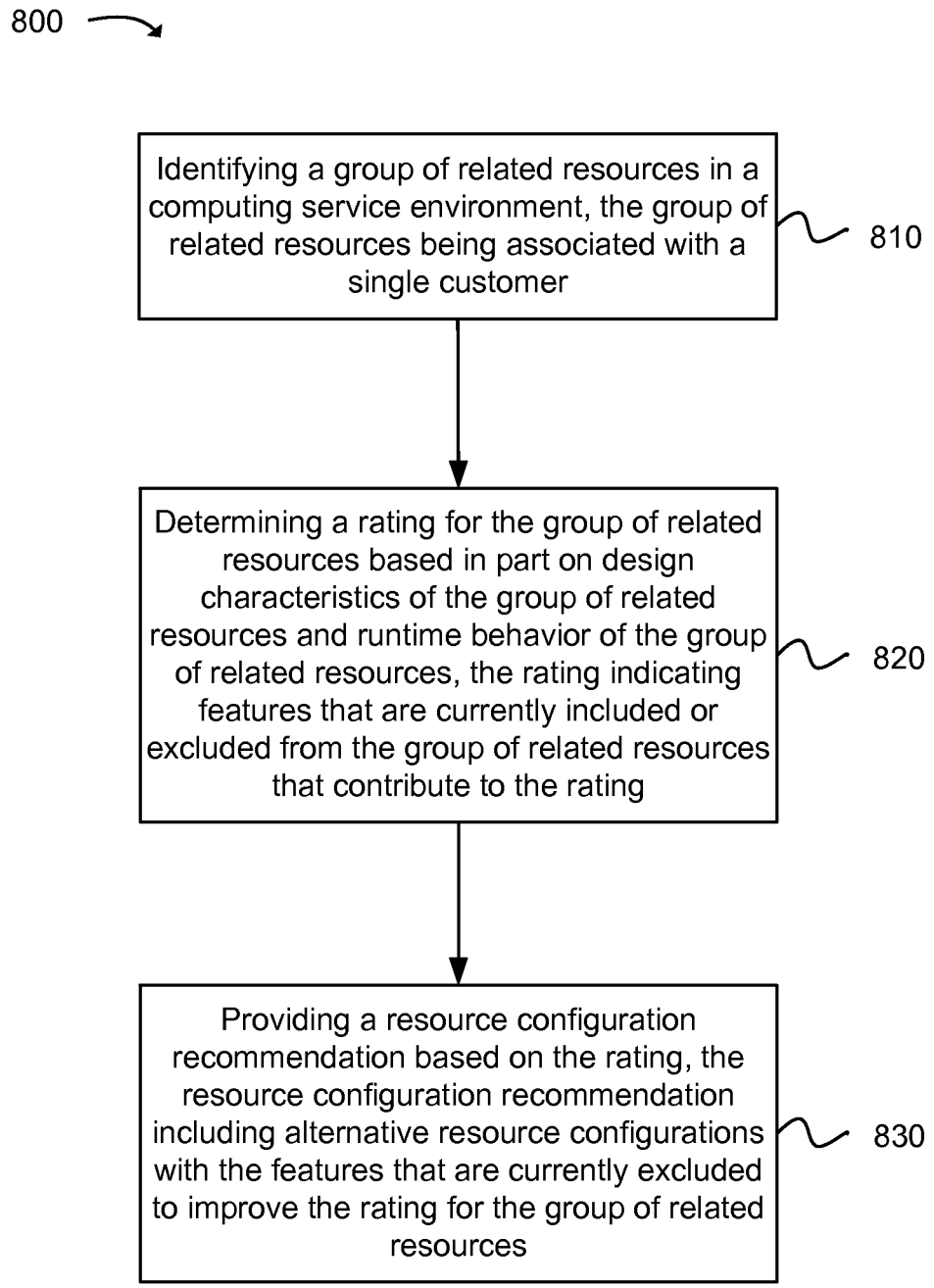
FIG. 8 is a flowchart of another example method for providing assessments of resource deployments in a computing service environment.

FIG. 8 illustrates an example of a method for providing assessments of resource deployments. A group of related resources may be identified in a computing service environment, as in block 810. The resources may include computing instances and/or storage resources in the computing service environment. In one example, the group of related resources may be associated with a single customer.

In one example, a set of tags for resources in the computing service environment may be received from a customer. The tags may have been previously created by the customer. The group of related resources may be defined starting with the set of tags. In another example, customer account information may be received from a customer that identifies at least one resource being used by the customer. Other resources in the computing service environment may be identified that are used by the resource indicated in the customer account information. The group of related resources may be defined to include the other resources that are used by the resource indicated in the customer account information.

A rating for the group of related resources may be determined based in part on design characteristics of the group of related resources and runtime behavior of the group of related resources, as in block 820. The rating may indicate features that are currently included or excluded from the group of related resources that contribute to the rating. The rating may indicate an assessment of the deployment of the group of related resources with respect to a predefined set of best practice guidelines as compared to the design characteristics and runtime behavior of the group of resources. The rating may include separate numerical values for each of the design characteristics and runtime behaviors of the group of related resources.

In one example, the design characteristics of the group of related resources may relate to reliability of the group, security of the group, performance efficiency of the group and cost reduction for executing the group in the computing service environment. In another example, the rating for the group of related resources may be determined based on the runtime behavior that includes runtime metrics associated with the group of related resources and runtime problems associated with the group of related resources.

A resource configuration recommendation may be provided that includes alternative resource configurations with the features that are currently excluded to improve the rating for the group of related resources, as in block 830. In one example, the resource configuration recommendation may be provided by a resource architecture service operating in a computing service environment.

In one configuration, the group of related resources may be compared to a set of model systems with model ratings using a computing resource architecture service operating in the computing service environment. The group may be compared to the model systems in order to determine the rating for the group. Components in the set of model systems that are absent from the group of related resources may result in a reduced rating and components in the set of model systems that are included in the group of related resources may result in an increased rating. The components in the set of model systems that are absent from the group of related resources may be part of the alternative resource configurations included in the resource configuration recommendation.

The resource configuration recommendation for improving the rating of the group of related resources includes at least one of: a recommendation to launch additional resources that are included in the group; a recommendation to terminate certain resources that are included in the group; a recommendation to add security features to the group; or a recommendation to balance a load across the group. In addition, the group of related resources may be modified based on the resource configuration recommendation.

In one configuration, load testing may be performed on the group of related resources using a testing tool. An increased load may be applied to the group and performance metrics of the group may be determined when the group is subject to the increased load.

In one example, an application for determining the rating for the group of resources and the recommendation to improve the rating may be installed on a mobile computing device. The mobile computing device may be operable to connect with a data center that includes the group of resources.

Figure 9:
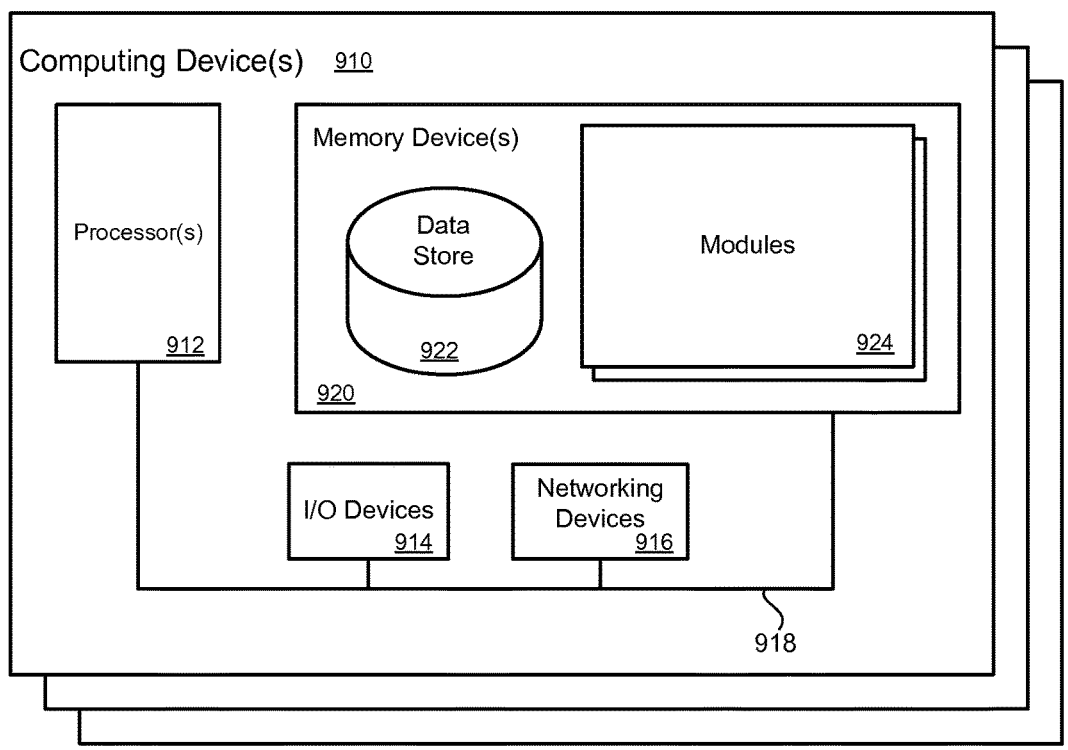
FIG. 9 is a block diagram that provides an example illustration of a computing device that may be employed in the present technology.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device may include a local communication interface 918 for the components in the computing device. For example, the local communication interface may be a local data bus and/or any related address or control busses as may be desired.

The memory device 920 may contain modules 924 that are executable by the processor(s) 912 and data for the modules 924. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen that is available to display output from the computing devices. Other known I/O device may be used with the computing device as desired. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for providing assessments of resource deployments in a computing service environment, the method comprising:
   receiving, using one or more processors of a computer system, a set of tags for resources in the computing service environment and customer account information associated with the resources;
   defining, using the one or more processors of a computer system, a group of related resources based in part on the set of tags for a period of time and the customer account information;
   identifying, using the one or more processors of the computer system, design characteristics of the group of related resources using a resource architecture service;
   identifying, using the one or more processors of the computer system, runtime behavior of the group of related resources using the resource architecture service;
   determining, using the one or more processors of the computer system, a rating for the group of related resources using the resource architecture service, the rating being determined based in part on the design characteristics and the runtime behavior of the group of related resources, the rating indicating an assessment of the deployment of the group of related resources with respect to a predefined set of best practice guidelines as compared to the design characteristics and runtime behavior; and
   providing, using the one or more processors of the computer system, a resource configuration recommendation from the resource architecture service based on the rating, the resource configuration recommendation including alternative resource configurations to improve the rating for the group of related resources.

2. The method of claim 1, further comprising testing the group of related resources for failures using a testing tool, wherein components of the group are removed or impaired by the testing tool to create failures in the group and performance metrics of the group are determined when the components of the group are removed or impaired.

3. The method of claim 1, further comprising comparing the group of related resources to a set of model systems with model ratings in order to determine the rating, wherein a comparison indicates components in the set of model systems that are absent from the group of related resources, wherein the components absent from the group are included in the resource configuration recommendation provided from the resource architecture service.

4. The method of claim 1, further comprising determining the rating for the group of related resources using the design characteristics that relate to reliability of the group, security of the group, performance efficiency of the group and cost reduction for executing the group in the computing service environment.

5. The method of claim 1, further comprising determining the rating for the group of related resources based on the runtime behavior that includes runtime metrics associated with the group of related resources, runtime problems associated with the group of related resources and external reports related to performance of the group of related resources that are generated during runtime of the group of related resources.

6. A method, comprising:
  identifying, using one or more processors of a computer system, a group of related resources using a resource architecture service in a computing service environment, the group of related resources being associated with a single customer and being defined using a set of tags;
  determining, using the one or more processors of the computer system, a rating for the group of related resources based in part on design characteristics of the group of related resources and runtime behavior of the group of related resources using the resource architecture service, the rating indicating features that are currently included or excluded from the group of related resources that contribute to the rating; and
  providing, using the one or more processors of the computer system, a resource configuration recommendation based on the rating using the resource architecture service, the resource configuration recommendation including alternative resource configurations with the features that are currently excluded to improve the rating for the group of related resources.

7. The method of claim 6, wherein the resource configuration recommendation is provided by a resource architecture service operating in the computing service environment.

8. The method of claim 6, further comprising:
  receiving the set of tags for resources in the computing service environment, wherein the tags are previously created by a customer; and
  defining the group of related resources starting with the set of tags.

9. The method of claim 6, further comprising:
  receiving customer account information that identifies at least one resource being used by a customer;
  identifying other resources in the computing service environment that are used by the resource indicated in the customer account information; and
  defining the group of related resources to include the other resources that are used by the resource indicated in the customer account information.

10. The method of claim 6, wherein the rating indicates an assessment of a deployment of the group of related resources using a predefined set of best practice guidelines as compared to the design characteristics and runtime behavior, wherein the rating includes separate numerical values for each of the design characteristics and runtime behaviors of the group of related resources.

11. The method of claim 6, further comprising comparing, using the resource architecture service operating in the computing service environment, the group of related resources to a set of model systems with model ratings in order to determine the rating, wherein components in the set of model systems that are absent from the group of related resources result in a reduced rating and components in the set of model systems that are included in the group of related resources result in an increased rating.

12. The method of claim 11, wherein the components in the set of model systems that are absent from the group of related resources are part of the alternative resource configurations included in the resource configuration recommendation.

13. The method of claim 6, further comprising performing load testing on the group of related resources using a testing tool, wherein an increased load is applied to the group and performance metrics of the group are determined when the group is subject to the increased load.

14. The method of claim 6, wherein the resource configuration recommendation for improving the rating of the group of related resources includes at least one of:
  a recommendation to launch additional resources that are included in the group;
  a recommendation to terminate certain resources that are included in the group;
  a recommendation to add security features to the group; or
  a recommendation to balance a load across the group,
  wherein the group of related resources is modified based on the resource configuration recommendation.

15. The method of claim 6, further comprising:
  determining the rating for the group of related resources based on the design characteristics of the group of related resources that relate to reliability of the group, security of the group, performance efficiency of the group and cost reduction for executing the group in the computing service environment; and
  determining the rating for the group of related resources based on the runtime behavior that includes runtime metrics associated with the group of related resources and runtime problems associated with the group of related resources.

16. The method of claim 6, wherein an application for determining the rating for the group of resources and the recommendation to improve the rating is installed on a mobile computing device that is operable to connect with a data center that includes the group of resources.

17. A system for providing assessments of resource deployments in a computing service environment, the system comprising:
  a processor;
  a memory device including a data store to store a plurality of data and instructions that, when executed by the processor, cause the processor to:
  define a group of related resources based in part on a set of tags associated with resources in the computing service environment;
  determine a rating for the group of related resources using a resource architecture service, the rating being determined based in part on design characteristics of the group of related resources and runtime behavior of the group of related resources, the rating indicating an assessment of the deployment of the group of related resources with respect to a predefined set of best practice guidelines; and
  provide a resource configuration recommendation based on the rating, the resource configuration recommendation including alternative resource configurations to improve the rating for the group of related resources.

18. The system of claim 17, wherein the plurality of data and instructions, when executed by the processor, cause the processor to: test the group of related resources for failures using a testing tool that operates in the computing service environment, wherein components of the group are systematically removed by the testing tool to create failures in the group and performance metrics of the group are determined when the components of the group are removed.

19. The system of claim 17, wherein the plurality of data and instructions, when executed by the processor, cause the processor to: compare the group of related resources to a set of model systems or other systems in a related industry in order to determine the rating of the group of related resources.

20. The system of claim 19, wherein the plurality of data and instructions, when executed by the processor, cause the processor to: provide the resource configuration recommendation that includes suggestions to incorporate features of the set of model systems or the other systems in the related industry into the group of related resources in order to improve the rating.

* * * * *